US006216000B1

(12) United States Patent
Blumhardt

(10) Patent No.: US 6,216,000 B1
(45) Date of Patent: Apr. 10, 2001

(54) SYSTEM AND METHOD FOR REGISTERING WIRELESS TELEPHONES TO SELECTED WIRELINES OF THE PUBLIC SWITCHED TELEPHONE NETWORK

(75) Inventor: Mark S. Blumhardt, Niwot, CO (US)

(73) Assignee: U S West, Inc., Denver, CO (US)

( * ) Notice: Subject to any disclaimer, the term of this patent is extended or adjusted under 35 U.S.C. 154(b) by 0 days.

(21) Appl. No.: 08/698,489

(22) Filed: Aug. 15, 1996

Related U.S. Application Data

(63) Continuation of application No. 08/301,286, filed on Sep. 6, 1994, now abandoned.

(51) Int. Cl.[7] .................................................. H04Q 7/20
(52) U.S. Cl. ................................................ 455/435; 455/6.3
(58) Field of Search ..................................... 455/435, 450, 455/451, 436, 6.3; 348/10

(56) References Cited

U.S. PATENT DOCUMENTS

| 4,748,655 | * | 5/1988 | Thrower et al. ................ 379/58 X |
| 5,469,495 | * | 11/1995 | Beveridge .......................... 379/56 |
| 5,629,978 | * | 5/1997 | Blumhardt et al. ................. 455/6.3 |

FOREIGN PATENT DOCUMENTS

2237709 * 5/1991 (GB) .

OTHER PUBLICATIONS

"The Building of Intelligent Networks", Architecture and Systems from Alcatel, 1989, pp. 5–21.*

"Service Control Point (SCP) for the GSM and PCS" IEEE, 1991, pp. 12–17.*

* cited by examiner

Primary Examiner—Dwayne D. Bost
Assistant Examiner—Myron K. Wyche
(74) Attorney, Agent, or Firm—Brooks & Kushman P.C.

(57) ABSTRACT

A system and method for registering a wireless telephone which is normally operative in its corresponding wireless telephone network to a selected wireline of the Public-Switched Telephone Network (PSTN) wherein upstream signaling takes place out-of-band. A base station in electrical communication with one or more selected PSTN wirelines detects when the wireless telephone comes within its registration range. A Set-Top Terminal (STT) in electrical communication with the base station and the broadband network provides the interface to send upstream signaling to the PSTN and the corresponding wireless telephone network through the broadband network. The STT coordinates the delivery of upstream signaling, sets up the physical connections between the PSTN and the STT for billing and other purposes and coordinates the delivery of the upstream signaling to other service providers, where applicable.

21 Claims, 2 Drawing Sheets

SYSTEM AND METHOD FOR REGISTERING WIRELESS TELEPHONES TO SELECTED WIRELINES OF THE PUBLIC SWITCHED TELEPHONE NETWORK

This application is a continuation, of application Ser. No. 08/301,286, filed Sep. 6, 1994, now abandoned.

TECHNICAL FIELD

This invention relates generally to wireless telephone registration. More particularly, this invention relates to a system and method for registering a wireless telephone which is normally operative in its corresponding wireless telephone network, to a selected wireline of the Public-Switched Telephone Network (PSTN).

BACKGROUND ART

Multi-mode wireless handsets are currently available and in use. Handsets of this type typically function in a cellular/PCS mode as well as in a cordless phone mode. A schematic drawing of a typical prior art multi-mode wireless system is shown in FIG. 1 and represented generally by reference numeral 10.

The prior art system 10 includes a wireless handset 12 which is provided in electrical communication with a home or office base station 14 which includes a land-based telephone 16. Base station 14 and telephone 16 are both provided in electrical communication with the Public-Switched Telephone Network (PSTN) which is generally referred to by reference numeral 18. PSTN 18 includes at least one Service Switching Point (SSP), also called a central office switch 20, which is provided in electrical communication with a Service Control Point (SCP)/Home Location Register (HLR) 22 via a Service Transfer Point (STP) 24 and appropriate signaling links. In this AIN architecture, Common Channel Signaling (CCS) is utilized which is a method for exchanging information between Stored Program Control Systems (SPCSs) (not shown) that are interconnected through a network of signaling links.

As those skilled in the art will recognize, CCS network nodes may include, but are not limited to, switching systems, network databases and operator services systems. When implemented on an SPCS, CCS serves the dual role of (1) providing a transport mechanism necessary to carry feature information between the SPCS and other nodes in the CCS network; and (2) defining how service information shall be encoded to allow other nodes to correctly interpret CCS communications from the SPCS. For interswitch calls, the protocol used for CCS is Signaling System No. 7. SS7 is designed to be used primarily in high speed digital networks yet is capable of controlling low-speed analog facilities as well. SS7 generally operates at 64 kBPS and can support variable message links up to 2,176 bits (272 octets) of information per message.

As shown, handset 12 of FIG. 1 is operative to function in both a cellular/PCS mode as well as in a cordless phone mode. While away from home, the subscriber can enjoy a single handset using the cellular/PCS network. While at home, the subscriber can enjoy the same handset in a cordless phone mode, placing calls over the wireline network of the Public-Switched Telephone Network 18; much cheaper than cellular/PCS rates.

In order for this to happen, a registration needs to take place, where the registration "tells the network to send all calls to either the wireline network or cellular/PCS network". Upon detection that a wireless handset has entered the base station's serving area, calls are routed to a wireline line. The handset will then function as a cordless phone.

Given the narrowband environment shown in FIG. 1 in which AIN currently exists, wireline registration requires the base station 14 to dial an administration number, "listen" to tones via tone detection technology, and then enter registration information via Dual Tone Multi-Frequency (DTMF) digits. There are, of course, obvious disadvantages to this implementation, namely, (1) if the wireline line is busy, registration cannot take place (additional lines to avoid this problem would increase costs); (2) tone detection and DTMF digit transmission is more error-prone than digital transactions; and (3) security procedures in the narrowband implementation shown is limited to PINs and caller ID; no encryption is readily available.

Consequently, a need has developed for a method and system operative to register wireless telephones to the Public-Switched Telephone Network wherein signaling takes place out-of-band.

DISCLOSURE OF THE INVENTION

It is an object of the present invention to provide a system and method for registering a wireless telephone which is normally operative in its corresponding wireless telephone network to a selected wireline of the Public-Switched Telephone Network (PSTN) wherein upstream signaling takes place out-of-band.

Still further, it is an object of the present invention to provide a method and system as above, wherein the upstream signaling takes place via the broadband network.

Yet still further, it is an object of the present invention to provide a method and system, as above, wherein a wireless telephone is registered to selected wirelines of the Public-Switched Telephone Network.

Yet still further, it is an object of the present invention to provide a method and system for registering a wireless telephone to a selected wireline of the Public-Switched Telephone Network through the use of a base station, the broadband network and a Set-Top Terminal (STT) which provides the interface to the base station and upstream signaling through the broadband network.

In carrying out the above-stated objects and other objects, features and advantages of the present invention, there is provided a system for registering a wireless telephone to one or more selected wirelines of the PSTN. The wireless telephone is normally operative in its corresponding wireless telephone network such as the cellular telephone network, Personal Communication System (PCS) having distributed radio port architecture or any other suitable wireless network. A base station is provided in electrical communication with one or more selected PSTN wirelines for detecting when the wireless telephone comes within its registration range. A Set-Top Terminal (STT) is also provided in electrical communication with the base station and the broadband network. The STT is operative to send upstream signaling to the PSTN and the corresponding wireless telephone network through the broadband network.

In the preferred embodiment, the PSTN is AIN-equipped and thus includes Service Activation and Control functionality as well as a Service Switching Point (SSP) which is provided in electrical communication with the Service Activation and Control functionality. An AIN Service Control Point (SCP)/Home Location Register (HLR) is also provided in electrical communication with the SSP and the service activation and control functionality.

The broadband network typically comprises a level 1 network for coordinating delivery of upstream signaling from the STT to the PSTN as well as a level 2 gateway for setting up the physical connections between the PSTN and the STT and billing for the use of the broadband network by the base station. A level 3 application is also provided for coordinating the delivery of the upstream signaling from the STT through the PSTN to other AIN providers. Finally, a Customer Premises Equipment (CPE) device such as a telephone, fax machine, or the like, may be provided in electrical communication with the base station and is operative transparent to the registration process of the telephone handset.

In operation, the method of the present invention is provided for use in cooperation with the broadband network and, as stated above, is directed to registering a wireless telephone which is normally operative in its corresponding wireless telephone network, to a selected wireline of the Public-Switched Telephone Network (PSTN). The method comprises providing a base station having a corresponding registration range and which is in electrical communication with the wireless telephone and the PSTN. The method further comprises detecting when the wireless telephone comes within the base station registration range and generating corresponding upstream signaling. Finally, the method includes providing a Set-Top Terminal (STT) which is in electrical communication with the base station and the broadband network to (1) coordinate the delivery of the upstream signaling to the PSTN and the wireless telephone network through the broadband network; (2) set up the physical connections between the PSTN and the STT and bill for the use of the broadband network by the base station; and (3) coordinate the delivery of the upstream signaling from the STT through the PSTN to other AIN providers, where applicable.

The above objects and other objects, features, and advantages of the present invention are readily apparent from the following detailed description of the best mode for carrying out the invention when taken in connection with the accompanying drawings wherein like reference numerals correspond to like components.

BEST MODELS FOR CARRYING OUT THE INVENTION

Figure 1:
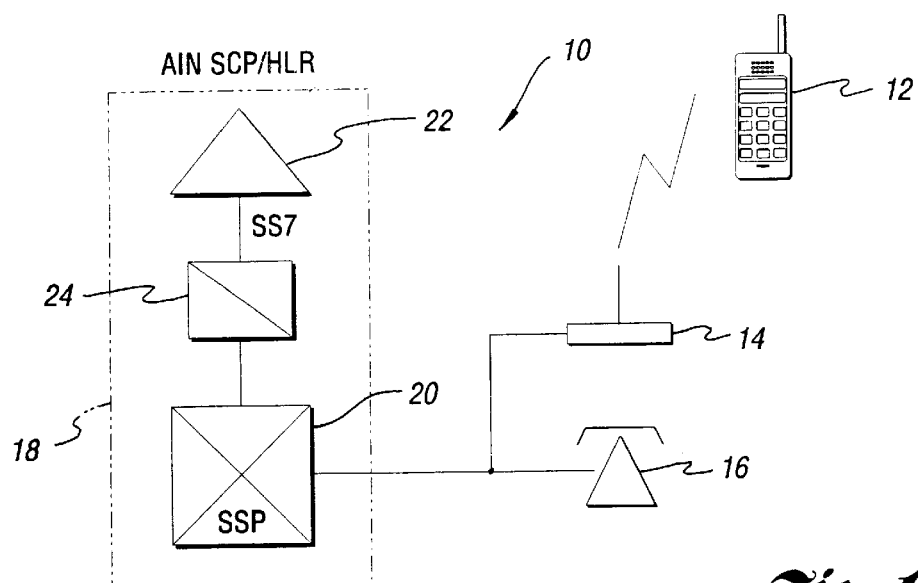
FIG. 1 is a schematic diagram of a prior art system for registering a wireless telephone handset to the PSTN.
Figure 2:
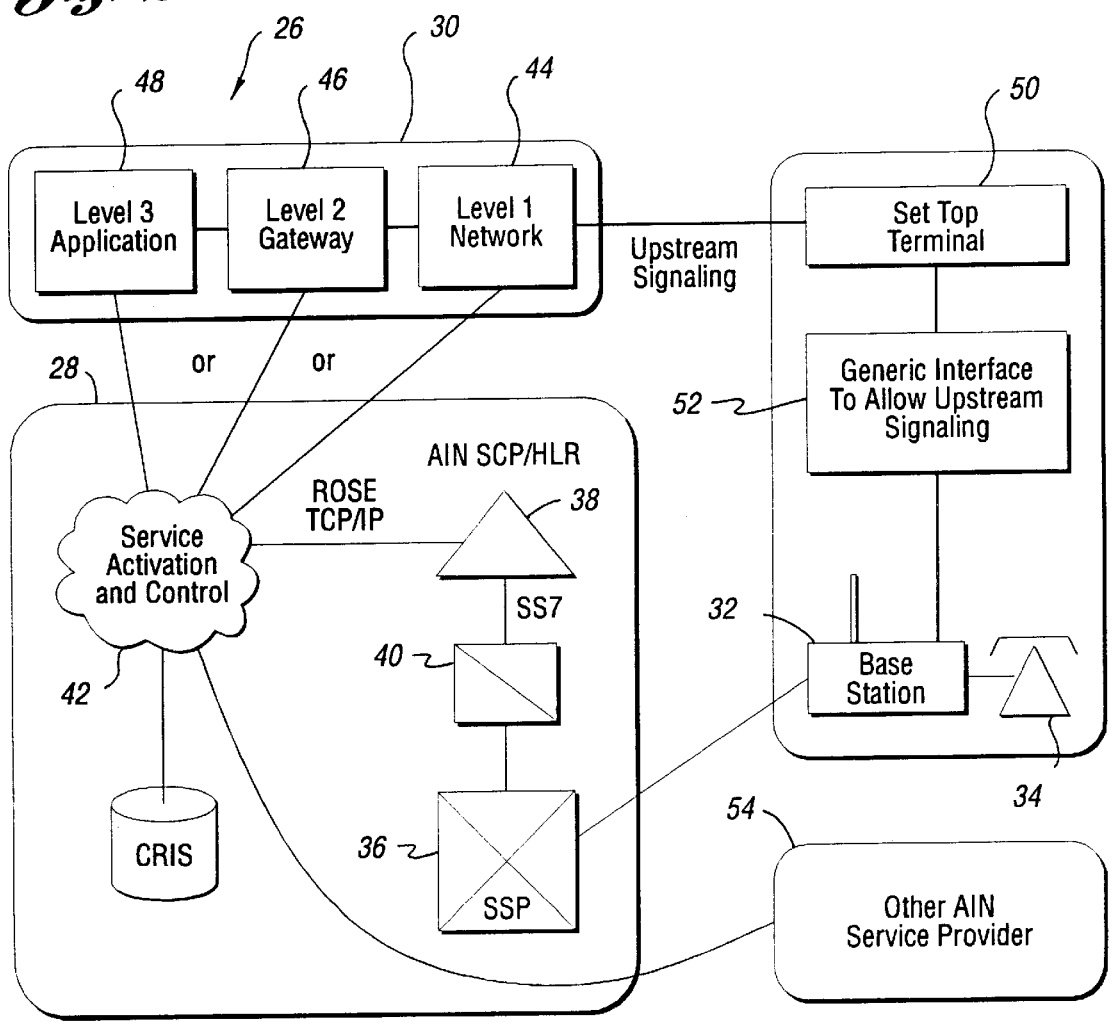
FIG. 2 is a schematic diagram of the system of the present invention which is operative to register a wireless handset to the PSTN through the broadband network.

FIG. 2 of the drawings is a schematic diagram of the system of the present invention, designated generally by reference numeral 26. System 26 is operative to register a wireless handset to the PSTN 28 via the broadband network 30. As shown, system 26 includes a base station 32 which is provided in electrical communication with a Customer Premises Equipment (CPE) device such as a land-based telephone, fax machine, modem, or the like 34. Base station 32 is further provided in electrical communication with PSTN 28 and, more particularly, to Service Switching Point (SSP) 36 through a wireline link preferably using Common Channel Signaling (CCS), and, more particularly, SS7 signaling. As those skilled in the art will recognize, SSP 36 is provided in electrical communication with an AIN SCP/HLR 38 within PSTN 28 through a Service Transfer Point (STP) 40, again through appropriate signaling links which are preferably SS7.

PSTN 28 further includes Service Activation and Control functionality 42 which is operative to perform the basic tasks of service delivery, i.e., the provision and modification of telephone services; and service assurance, i.e., maintenance of the telephone system. This service activation and control functionality typically takes the form of complex hardware and software which is generally manipulated by one or more operators at corresponding old legacy systems, i.e. service and operations centers. Service Activation and Control functionality 42 is of a type conventionally employed by PSTN service providers and is provided in electrical communication with SSP 36 via appropriate signaling links such as SS7 as also shown in FIG. 2.

Still referring to FIG. 2 of the drawings, PSTN 28 and, more particularly Service Activation Control functionality 42 is directly interfaced with the broadband network 30. Within the telephone industry, the term "broadband" denotes a very high digital line rate, such as the 156 megabits per second (Mb/S) optical line rate of new sonet OC3-level fiberoptic systems. Broadband network 30 is of a conventional type, which typically includes a level 1 network 44, a level 2 gateway 46 and a level 3 application 48. The broadband network 30, in accordance with the present invention, is provided in electrical communication with base station 32 through the use of Set-Top Terminal (STT) 50, which is connected to base station 32 through a generic interface 52 which is operative to receive upstream signaling.

As shown in FIG. 2, the fundamental principle of the present invention is to utilize the wireless and PSTN infrastructure that is in place today yet use the broadband network for upstream registration signaling. As referenced above, the broadband network is divided into three levels: the level 1 network, the level 2 gateway, and the level 3 video application. The level 1 network is concerned with the physical delivery of the video signals to the TV. It also handles up-stream communication from the STT 50. The level 2 gateway 46 provides the interface for the level 3 application 48 to access the network. It handles many of the bookkeeping functions such as launching level 3 applications, setting up the physical connections between the level 3 application and the STT, and billing for the use of the network.

The STT is an integral part of the broadband network 30 since it spans all three levels. Hardware is provisioned on the STT to terminate the network signals. Similarly, software resident on the STT provides interfaces with the level 2 gateway. Finally, applications are downloaded and executed on the STT which is also operative to access the capabilities stored on the level 2 gateway or on video application servers (not shown).

In keeping with the present invention, wireless base station 32 is operative to communicate with STT 50 through generic interface 52. The specific layers of this interface are not important, given that it meets performance needs and is extended to other signaling applications (e.g. utility, telemetry, implementations) as well as provide a low cost solution. For example, TCP/IP or simple RS232 may be appropriate.

In further keeping with the invention, the upstream signaling capability may appear as either a level 1, 2 or 3 application. This level 1, 2 or 3 application would communicate with Service Activation and Control functionality 42 within the PSTN 28. Providing the application as part of level 1 or level 2 would tie the integration of the application to the broadband network 30. It would further give the appearance of integration between the local and broadband subscriber loop. As a level 3 service, other AIN providers 54 could compete for subscribers on the network. This also means that the regional Bell operating companies utilizing the present invention could compete on other broadband networks for access to subscribers while the appearance of integration is maintained.

Upon subscription, the service described herein is downloaded into the Set-Top Terminal 50 and begins executing. The service is now free to interact with the wireless base station 32. Upon receipt of registration request from base station 32, registration messages are sent upstream to the PSTN 28 and, more particularly, Service Activation and Control functionality 42 through the broadband network 30. Service Activation and Control functionality 42 sends the appropriate updates to the SCP/HLR 38 and makes the appropriate changes for services as if a dial-up registration took place with the current (prior art) narrowband architecture.

Figure 3:
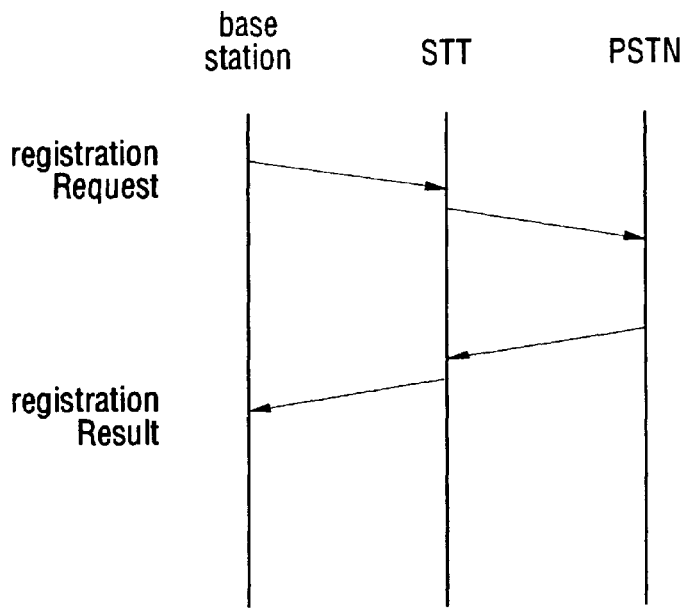
FIG. 3 is a schematic diagram of message flows in accordance with the present invention.

As shown more particularly in FIG. 3, the message flow between the base station, broadband network and PSTN are provided. Two messages can be used to transmit data between the broadband network 30 and the PSTN 28: (1) registration requests—wireless base station requests a wireline registration via broadband application signaling; and (2) registration result—result of registration. As shown in FIG. 3, upon detection that a wireless handset has entered the base station 32 registration area, the base station will send a registration request message to the STT 50. The STT 50 will then forward the registration request to the PSTN 28. The Service Activation and Control portion 42 of the PSTN 28 will respond with a registration result message and the broadband network 30 will then forward the registration result message to the wireless base station.

The exchange of information between the PSTN 28 and the broadband network 30 could be data in a tag-length-value format. The following is an ASN.1 representation of the data. It should be noted, however, that this is only an example and that the actual specification may be changed upon implementation.

```
registrationRequest        OPERATION
PARAMETER                  SEQUENCE{
                           UPT,
                           homeWorkIndicator
                           }
UPT::=[1]IMPLICIT digits
homeWorkIndicator::=[2]    IMPLICIT digit -- bits indi-
                           cating if base station is lo-
                           cated at work or home.
registrationResult         OPERATION
PARAMETER                  SEQUENCE{
                           UPT,
                           result
                           }
result::=[1]IMPLICIT digit -- indicator of success or failure.
```

Figure 4:
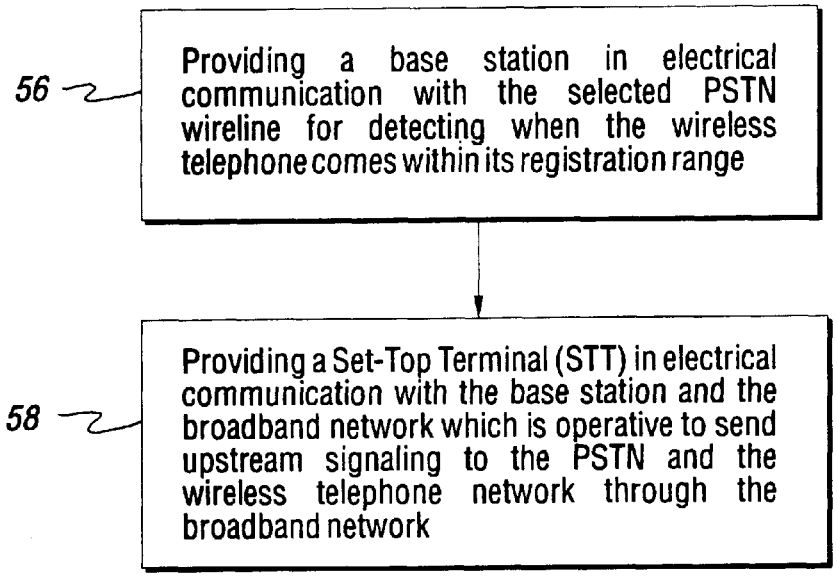
FIG. 4 is a block diagram of the method steps of the present invention.

With reference now to FIG. 4 of the drawings, more detailed method steps of the present invention will be described. As discussed above, the method is provided for use in cooperation with the broadband network and is specifically directed to registering a wireless telephone which is normally operative in its corresponding wireless telephone network, to a selected wireline of the PSTN. The method includes providing 56 a base station in electrical communication with the selected PSTN wireline for detecting when the wireless telephone comes within its registration range. The method further includes providing 58 a Set-Top Terminal (STT) in electrical communication with the base station and the broadband network, which is operative to send upstream signaling to the PSTN and the wireless telephone network through the broadband network.

While the best modes for carrying out the invention have been described in detail, those familiar with the art to which this invention relates will recognize various alternative designs and embodiments for practicing the invention as defined by the following claims.

What is claimed is:

1. For use in cooperation with a Broadband Network, for carrying video signals to a television, a system for registering a wireless telephone which is normally operative in its corresponding Wireless Telephone Network, to a selected wireline of the Public Switched Telephone Network (PSTN), comprising:

a base station at a user premises for detecting when said wireless telephone comes within its registration range, said base station in electrical communication with said selected PSTN wireline; and a Set Top Terminal (STT) in electrical communication with said base station and said Broadband Network, said STT operative to send upstream signaling to said PSTN and said Wireless Telephone Network through said Broadband Network.

2. A system as in claim 1, wherein said Wireless Telephone Network is the Cellular Telephone Network.

3. A system as in claim 1, wherein said Wireless Telephone Network is a Personal Communication System (PCS) having Distributed Radio Port Control (DRPC) architecture.

4. A system as in claim 1, wherein said PSTN comprises:

Service Activation and Control Functionality;

a Service Switching Point (SSP) in electrical communication with said Service Activation and Control functionality; and an AIN Service Control Point (SCP)/Home Location Register(HLR) in electrical communication with said SSP and said Service Activation and Control functionality.

5. A system as in claim 4, wherein said base station is in electrical communication with said SSP.

6. A system as in claim 4, wherein said AIN SCP/HLR is in electrical communication with said wireless Telephone Network.

7. A system as in claim 4, wherein said PSTN Service Activation and Control functionality is operative to communicate with various databases and systems in order to activate, de-activate, change or query data and services.

8. A system as in claim 4, wherein said Broadband Network comprises:

a level 1 network for coordinating the delivery of said upstream signalling from said STT to said PSTN;

a level 2 Gateway for setting up the physical connections between said PSTN and said STT and bill for the use of said Broadband Network by said base station; and a level 3 application for coordinating the delivery of said upstream signalling from said STT through said PSTN to other AIN providers.

9. A system as in claim 1, further comprising a Customer Premises Equipment Device (CPE) in electrical communication with said base station.

10. A system as in claim 9, wherein said CPE device is a land-based telephone.

11. For use in cooperation with a Broadband Network, for carrying video signals to a television, a method for registering a wireless telephone which is normally operative in its corresponding Wireless Telephone Network, to a selected wireline of the Public Switched Telephone Network (PSTN), the method comprising:

providing a base station at a user premises for detecting when said wireless telephone comes within its registration range, said base station in electrical communication with said selected PSTN wireline; and providing a Set Top Terminal (STT) in electrical communication with said base station and said Broadband Network, said STT operative to send upstream signaling to said PSTN and said Wireless Telephone Network through said Broadband Network.

12. A method as in claim 11, wherein said Wireless Telephone Network is the Cellular Telephone Network.

13. A method as in claim 11, wherein said Wireless Telephone Network is a Personal Communication System (PCS) having Distributed Radio Port Control (DRPC) architecture.

14. A method as in claim 11, wherein said PSTN comprises:

Service Activation and Control Functionality;

a Service Switching Point (SSP) in electrical communication with said Service Activation and Control functionality; and an AIN Service Control Point (SCP)/Home Location Register(HLR) in electrical communication with said SSP and said Service Activation and Control functionality.

15. A method as in claim 14, wherein said base station is in electrical communication with said SSP.

16. A method as in claim 14, wherein said AIN SCP/HLR is in electrical communication with said wireless Telephone Network.

17. A method as in claim 14, wherein said PSTN Service Activation and Control functionality is operative to communicate with various databases and systems in order to activate, de-activate, change or query data and services.

18. A method as in claim 14, wherein said Broadband Network comprises:

a level 1 network for coordinating the delivery of said upstream signalling from said STT to said PSTN;

a level 2 Gateway for setting up the physical connections between said PSTN and said STT and bill for the use of said Broadband Network by said base station; and a level 3 application for coordinating the delivery of said upstream signalling from said STT through said PSTN to other AIN providers.

19. A method as in claim 11, further comprising providing a Customer Premises Equipment (CPE) device in electrical communication with said base station.

20. A method as in claim 19, wherein said CPE device is a land-based telephone.

21. For use in cooperation with a Broadband Network, for carrying video signals to a television, a method for registering a wireless telephone which is normally operative in its corresponding Wireless Telephone Network, to a selected wireline of the Public Switched Telephone Network (PSTN), the method comprising:

providing a base station at a user premises having a corresponding registration range and in electrical communication with said wireless telephone and said PSTN;

detecting when said wireless telephone comes within said base station registration range and generating corresponding upstream signaling;

providing a Set Top Terminal (STT) in electrical communication with said base station and said Broadband Network to (1) coordinate the deliver of said upstream signaling to said PSTN and said Wireless Telephone Network through said Broadband Network, (2) set up the physical connections between said PSTN and said STT and bill for the use of said Broadband Network by said base station, and (3) coordinate the delivery of said upstream signaling from said STT through said PSTN to other AIN providers.

\* \* \* \* \*